United States Patent [19]
Kitamura

[11] Patent Number: 5,881,603
[45] Date of Patent: Mar. 16, 1999

[54] TRANSFER UNIT

[75] Inventor: Masatoshi Kitamura, Daito, Japan

[73] Assignee: Nawaseikiseisakushi Corporation, Japan

[21] Appl. No.: 792,463

[22] Filed: Jan. 31, 1997

Related U.S. Application Data

[62] Division of Ser. No. 551,916, Oct. 23, 1995, Pat. No. 5,634,376.

[30] Foreign Application Priority Data

Nov. 2, 1994 [JP] Japan .................................. 6-569478

[51] Int. Cl.$^6$ ........................................................ B25J 9/12
[52] U.S. Cl. .......................... 74/490.03; 108/20; 108/141; 269/60; 269/71; 269/73; 414/744.3; 414/749; 901/23
[58] Field of Search ............................ 74/490.03, 490.08, 74/490.09; 269/60, 71, 73; 901/16, 23; 414/744.3, 749; 108/20, 21, 22, 141, 143

[56] References Cited

U.S. PATENT DOCUMENTS

| | | | |
|---|---|---|---|
| 4,345,864 | 8/1982 | Smith, Jr. et al. ..................... | 901/15 X |
| 4,735,548 | 4/1988 | Kimata et al. ........................ | 414/744.3 |
| 4,896,869 | 1/1990 | Takekoshi ................................ | 269/60 |
| 5,054,991 | 10/1991 | Kato ...................................... | 108/20 X |
| 5,085,556 | 2/1992 | Ohtomi ................................ | 414/744.3 |
| 5,099,707 | 3/1992 | Tori et al. ............................ | 74/89.15 |
| 5,467,813 | 11/1995 | Vermaat ............................ | 414/744.3 X |
| 5,511,933 | 4/1996 | Herklotz ................................ | 414/749 |
| 5,558,487 | 9/1996 | Nakagawa ............................ | 414/744.6 |

*Primary Examiner*—Charles A. Marmor
*Assistant Examiner*—Troy Grabow
*Attorney, Agent, or Firm*—Evenson, McKeown, Edwards & Lenahan, P.L.L.C.

[57] ABSTRACT

A transfer unit for moving an object vertically, horizontally or rotationally has a drive mechanism installed on a horizontal bed, with a transfer portion mounted on the drive mechanism. The transfer portion includes a vertically disposed rotatable threaded shaft which cooperates with a nut mounted thereon to provide a vertical movement component for the transfer portion. A workpiece receiver mounted on top of the transfer portion is rotatable about a vertical axis. Motors are provided for rotating the nut and the workpiece receiver, respectively.

1 Claim, 9 Drawing Sheets

TRANSFER UNIT

This is a divisional of application Ser. No. 08/551,916, filed Oct. 25, 1995.

BACKGROUND OF THE INVENTION

This invention relates to a transfer unit for moving an object in a vertical, horizontal or rotation direction.

When products are completed in a factory through a series of production lines, a transfer unit is used for moving a workpiece to the next working process to provide smooth production line work. Generally, in a conventional transfer unit, an object has been transferred in a horizontal direction and in a vertical direction separately and independently, and a workpiece has been manually moved in a rotation direction required for the working process after moving the workpiece onto a work bench.

When the conventional transfer unit is provided with a function to move the object in a vertical direction and a horizontal direction simultaneously, the structure of the unit becomes complicated, the manufacturing cost is increased, and a large space is required in order to install the unit. Further, when moving the workpiece from one work bench to another work bench, its position cannot be corrected for the next working process during its movement so that a time loss is created because its position must be corrected after it is mounted on the work bench, and this correction must be done manually.

SUMMARY OF THE INVENTION

In one aspect, a transfer unit, comprising a first motor 4 for rotating a first shaft 1 is connected to said first shaft 1, said first and second nuts 2, 3 are screwed onto the first shaft 1 respectively, said first nut 2 is engaged with a first holder 13 to which a second motor 5 for rotating the first nut 2 is mounted, the first holder 13 is provided with a first bracket 6 to which one end of said first and second connecting rods 9, 10 are rotatably connected, a second bracket 7 is rotatably connected to the other end of the first and second connecting rods 9, 10 so that the first and second connecting rods 9, 10 are parallel, a second holder 12 is fixed to said second nut 3, said first holder 13 and said second holder 12 are slidably mounted on a guide rail 30 installed in parallel with the first shaft 1 so as to be moved along the guide rail 30 when the first shaft 1 rotates, said second holder 12 is provided with a third bracket 8, one end of a third connecting rod 11 is rotatably connected to the third bracket 8, and a central part of said second connecting rod 10 is rotatably connected to the other end of said third connecting rod 11

In another aspect, a transfer unit as described above, further comprising a fourth bracket 31 rotatably connecting one end of fourth and fifth connecting rods 34, 35 having the same lengths is provided at right angles to the first bracket 6, a fifth bracket 32 is rotatably connected to said fourth and fifth connecting rods 34, 35 at their other end so that the fourth and fifth connecting rods 34, 35 are parallel, a sixth bracket 33 is fixed to said second holder 12 at right angles to the third bracket 8, one end of a sixth connecting rod 36 is rotatably connected to said sixth bracket 33, and a central part of said fifth connecting rod 35 is rotatably connected to the other end of the sixth connecting rod 36.

A transfer unit as described above, wherein the transfer unit is installed on a first bed 25a rotated freely by a third motor 24 so that said first shaft 1 is put in a vertical position, and said transfer unit can be rotated to a predetermined angle by said third motor 24.

A transfer unit, comprising a drive mechanism 56 installed on a horizontal second bed 55; two-point stoppers 70 installed in the vicinities of both ends of the drive mechanism 56; to finely adjust the direction of the transfer portion 57; said transfer portion 57 being mounted on the drive mechanism 56, said transfer portion 57 including a first plate 60, and a second plate 58 located above and parallel to said first plate 60 in parallel and in a position to said first plate 60 of plural a plurality of pillars 52 arranged between the said first and second plate and both ends of a shaft 51 having a threaded portion and screwed in a third nut 53 secured to said first and second plate 60, 58 at both ends thereof, and a workpiece receiver 67 being installed on an upper face of said second plate 58 so as to be rotatable relative to said second plate 58 only, a large gear 64 being fixed to a bottom face of the workpiece receiver, a small gear 66 engaging with the large gear 64 and rotated by a fourth motor 65 is fitted to said second plate 58, a third plate 59 is fixed to said third nut 53, and a fifth motor 54 rotating said third nut 53 is installed on said third plate 59.

Vertical and horizontal movements of a workpiece holding portion can be controlled by using one threaded shaft and only rotating the nut screwed onto the threaded shaft. The structure is simple and requires a small cost in manufacture, and its maintenance is easy because no special part is used.

No large space is required for the transfer unit so that it can be used in a narrow space.

Since two workpieces can be transferred simultaneously by arms 90, 91, a work efficiency can be improved. Since only one unit can handle the operations that have required two machines to be carried out so far, the cost of the unit can be reduced. Further, the installation area is about similar to that of claim 1 so that the space can be minimized.

Since the workpieces held by the arms can be rotated in a predetermined direction by installing the transfer units described above on the rotating bed, work efficiency can be improved.

In plural work processes, it is necessary to properly change directions and heights of the workpieces on the work benches, because installed directions of the workpieces are not necessarily identical in respective work processes. In this invention, however, the workpiece can be installed on the next work bench quickly so that the work time can be shortened, because the workpiece can be changed in its direction and height midway of being transported to a work bench of the next work process by using the transfer unit having simple structure.

DETAILED DESCRIPTION OF THE INVENTION

First Embodiment

Figure 1:
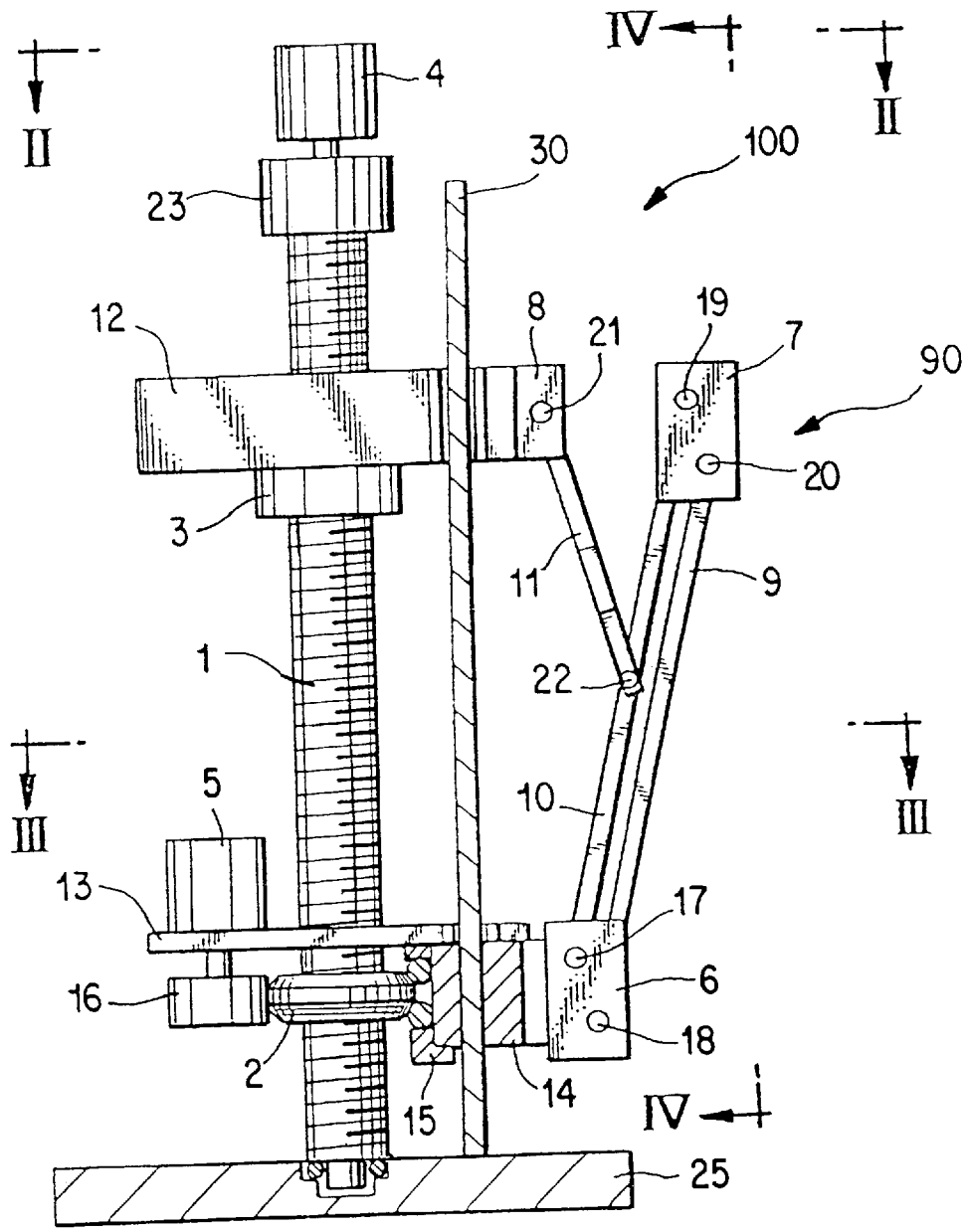
FIG. 1 is a partially sectional vertical view of a transfer unit of this invention.

FIG. 1 shows a partially sectional side view of a transfer unit 100 of this invention. The transfer unit 100 is composed of a steel shaft 1, nuts 2, 3, motors with servo mechanisms 4, 5, brackets having channel steel structure 6, 7 and 8, and connecting rods 9, 10 and 11 etc.

The shaft is threaded over its entire length, and the nuts 2, 3 are screwed onto the shaft 1 as illustrated in FIG. 1.

Figure 2:
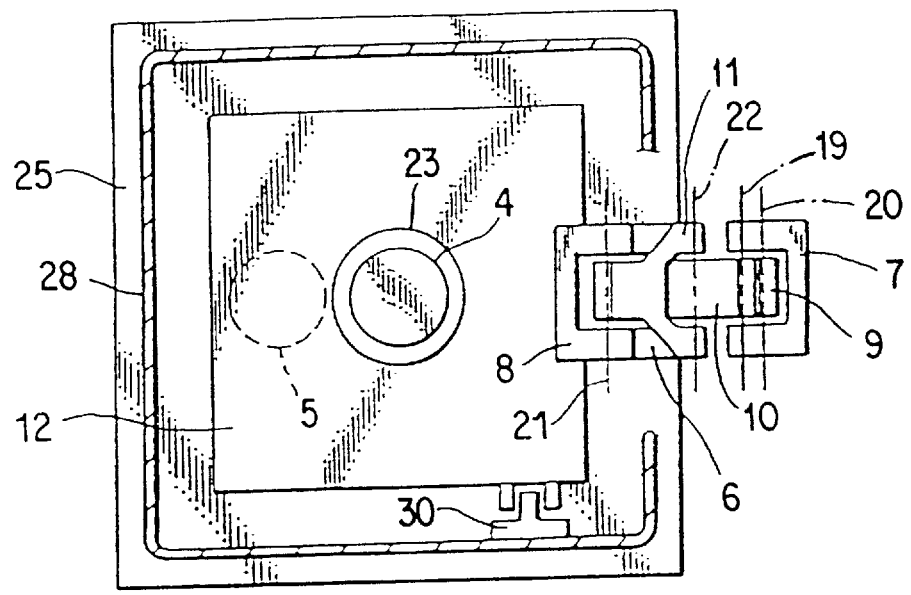
FIG. 2 is a view seen in the direction of arrow II—II of FIG. 1.
Figure 3:
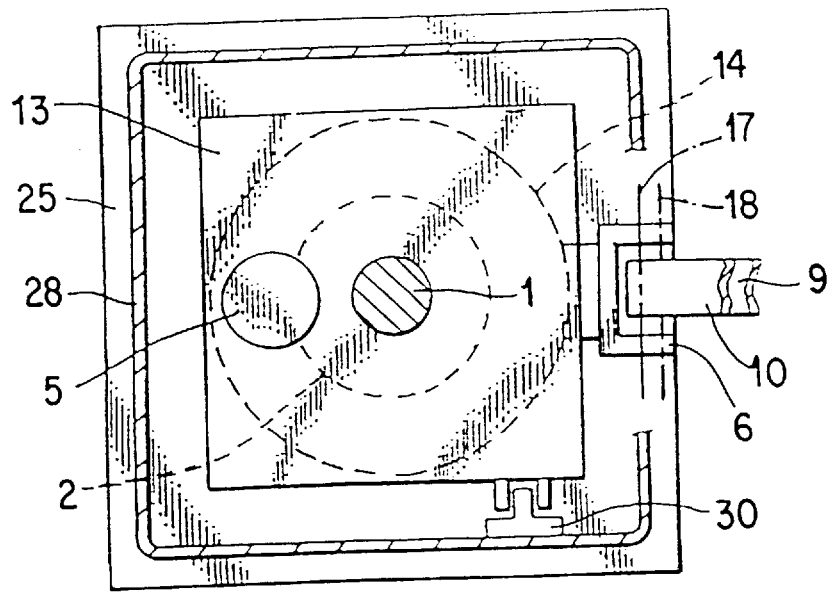
FIG. 3 is a view viewed in a direction of arrow III—III of FIG. 1.
Figure 4:
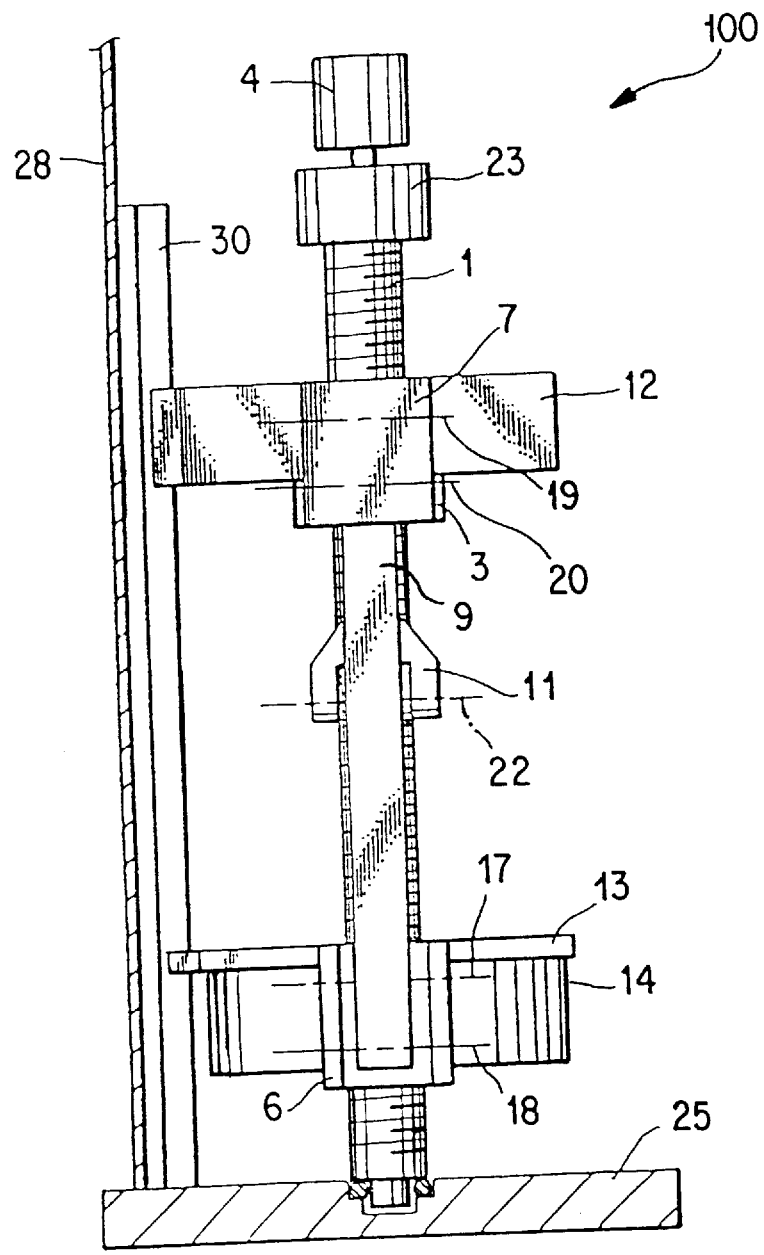
FIG. 4 is a view viewed in a direction of arrow IV—IV of FIG. 1.

A holder 12 is fixed to the nut 3 so as not to contact with the shaft 1, two guides 12a engaging with the guide rail 30 are fixed to the holder 12 as illustrated in FIGS. 1, 2 and 4, and the guide rail 30 engages with them so as to be sandwiched between the two guides 12a. Webs of the channel shaped bracket 8 are fixed to the holder 12.

The holder 13 secures the nut 2 by outside-fit through a bracket 14 fixed to the holder 13, an outer race 15 fixed to the bracket 14 by not-shown bolts, and a bearing 15a carried by the outer race 15. The motor 5 is fixed to the holder 13, a gear 16 is mount on a drive shaft of the motor 5, and the gear 16 engages with the nut 2 having a geared outer peripheral side face.

The motor 5 is provided with a servo mechanism and equipped with a brake mechanism so as not to fall off by its own weight.

Two guides 13a engaging with the guide rail 30 are fixed to the holder 13 as illustrated in 1, 3 and 4, and the guide rail 30 engages with them so as to be sandwiched between the two guides 13a.

Although not shown in the figure, tapped holes are made on the bracket 14 and the bracket 6 is secured to it by passing not-shown bolts into through holes made on the bracket 6 and screwing them into the tapped holes.

As shown in FIG. 1, the connecting rods 9, 10 having the same lengths are connected at one end to the bracket 6 by connecting pins 17, 18 and the other and of end of the connecting rods 9, 10 is connected to the bracket 7 by using connecting pins 19, 20, so that the connecting rods 9, 10 are put in parallel positions.

The bracket 8 is connected by a connecting pin 21 to a not-shown end of a fork-shaped connecting rod 11 as shown in FIG. 2, and a forked end of the connecting rod 11 is connected by a connecting pin 22 to a central part of the connecting rod 10.

An arm 90 is composed of the brackets 6, 7 and 8, the connecting rods 9, 10 and 11, and the connecting pins 17, 18, 19, 20, 21 and 22.

A motor 4 is installed through a coupling 23 on top of the shaft 1 as illustrated in FIG. 1, a bed 25 provided with a bearing is installed at the lower end of the shaft 1, the motor 4 is fixed to a not-shown external wall 28 of the transfer unit 100, and the shaft 1 is rotated when the motor 4 is driven.

The bracket 7 is provided with a workpiece holding portion (not shown) for holding the workpiece. The workpiece holding portion may have a structure to hold the workpiece by means of magnetic absorption force using a magnet (an electromagnet) or by sandwiching it. Any mechanism may be used for the holding portion if it holds the workpiece positively.

The function will be explained hereunder.

The bracket 7 provided with the workpiece holding portion is located near to the bracket 8 at first, and the arm 90 is in the position shown FIG. 1.

In order to move the bracket 7 (workpiece holding portion) only in a vertical direction from this position, the gear 16 meshing with the nut 2 is to be locked by the brake mechanism of the motor 5 so as not to allow the nut 2 to rotate together with the shaft 1, the motor 4 is driven under this state to rotate the shaft 1 so as to move the nuts 2, 3 upward relative to the shaft 1.

Since the holders 12, 13 and the arm 90 are moved upward when the nuts 2, 3 are moved upward, the bracket 7 (workpiece holding portion) can be moved upward. Further, when the motor 4 is rotated in the reverse direction, the bracket 7 (workpiece holding portion) can be moved downward.

In the next place, in order to move the bracket 7 (workpiece holding portion) apart from the bracket 8 in a horizontal direction, the motor 4 is to be stopped and the motor 5 is to be driven to rotate the nut 2 engaging with the gear 16 to move upward relative to the shaft 1, so as to allow the nut 2 to come near to the nut 3.

Figure 5:
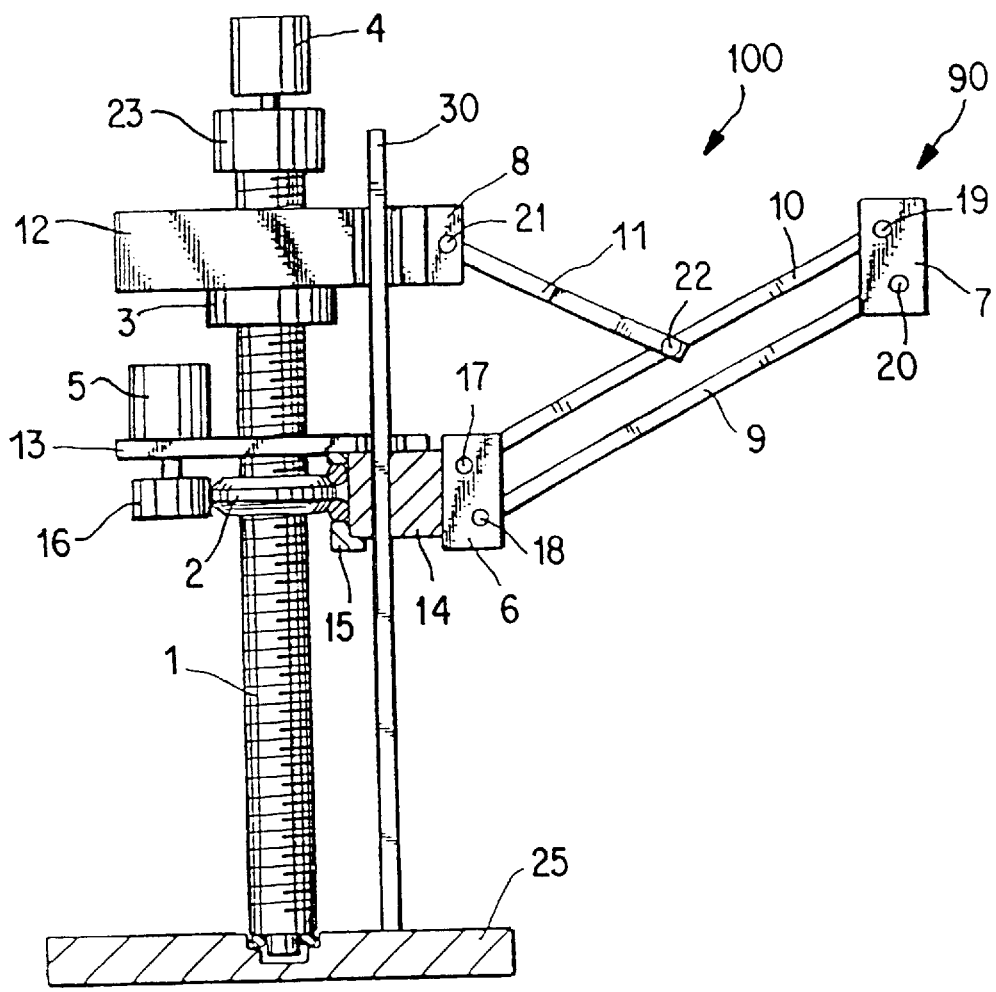
FIG. 5 is a view in which the arm is moved in horizontal direction and vertical direction from FIG. 1.

As the nut 2 comes near to the nut 3, an intersecting angle between the connecting rods 10, 11 (angle made by the connecting pins 21, 22, 17 of FIG. 1) becomes acute, the connecting rod 10 rotates clockwise around the connecting pin 22, the connecting rod 11 rotates counterclockwise around the connecting pin 21, the arm 90 extends in the horizontal direction as illustrated in FIG. 5, and the bracket 7 (workpiece holding portion) moves in the horizontal direction apart from the bracket 8.

The operations are those for separately moving the workpiece holding portion in the vertical direction and the horizontal direction respectively. However, it can be moved in the vertical direction and the horizontal direction simultaneously when the motors 4, 5 are driven simultaneously.

When moving the workpiece holding portion in the vertical direction and the horizontal direction simultaneously, rotation speeds of the shaft 1 and the nut 2 are to be relatively adjusted by using the motors with servo mechanisms 4, 5, and horizontal and vertical moving speeds of the bracket 7 (workpiece holding portion) are to be adjusted appropriately.

Second Embodiment

Figure 6:
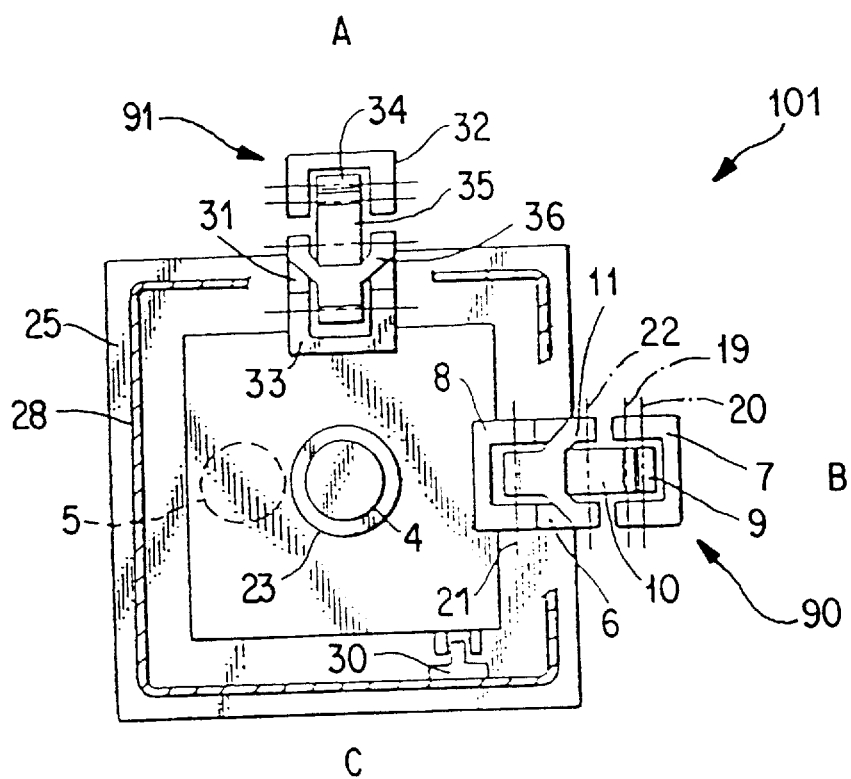
FIG. 6 is a plan view of a transfer unit to which the invention of claim 2 is applied.

FIG. 6 is a plan view of a transfer unit 101 (W-arm robot) in which an arm 91 having the same structure as that of the arm 90 is installed and the arms 90, 91 are fixed to the holders 12, 13 at right angles to each other.

Brackets 31, 32 and 33 of the arm 91 correspond to the brackets 6, 7 and 8 of the arm 90 respectively, and connecting rods 34, 35 and 36 of the arm 91 correspond to the connecting rods 9, 10 and 11 of the arm 90 respectively.

When the motor 4 or the motor 5 is driven, the arms 90 and 91 move in the vertical direction or the horizontal direction simultaneously.

Third Embodiment

Figure 7:
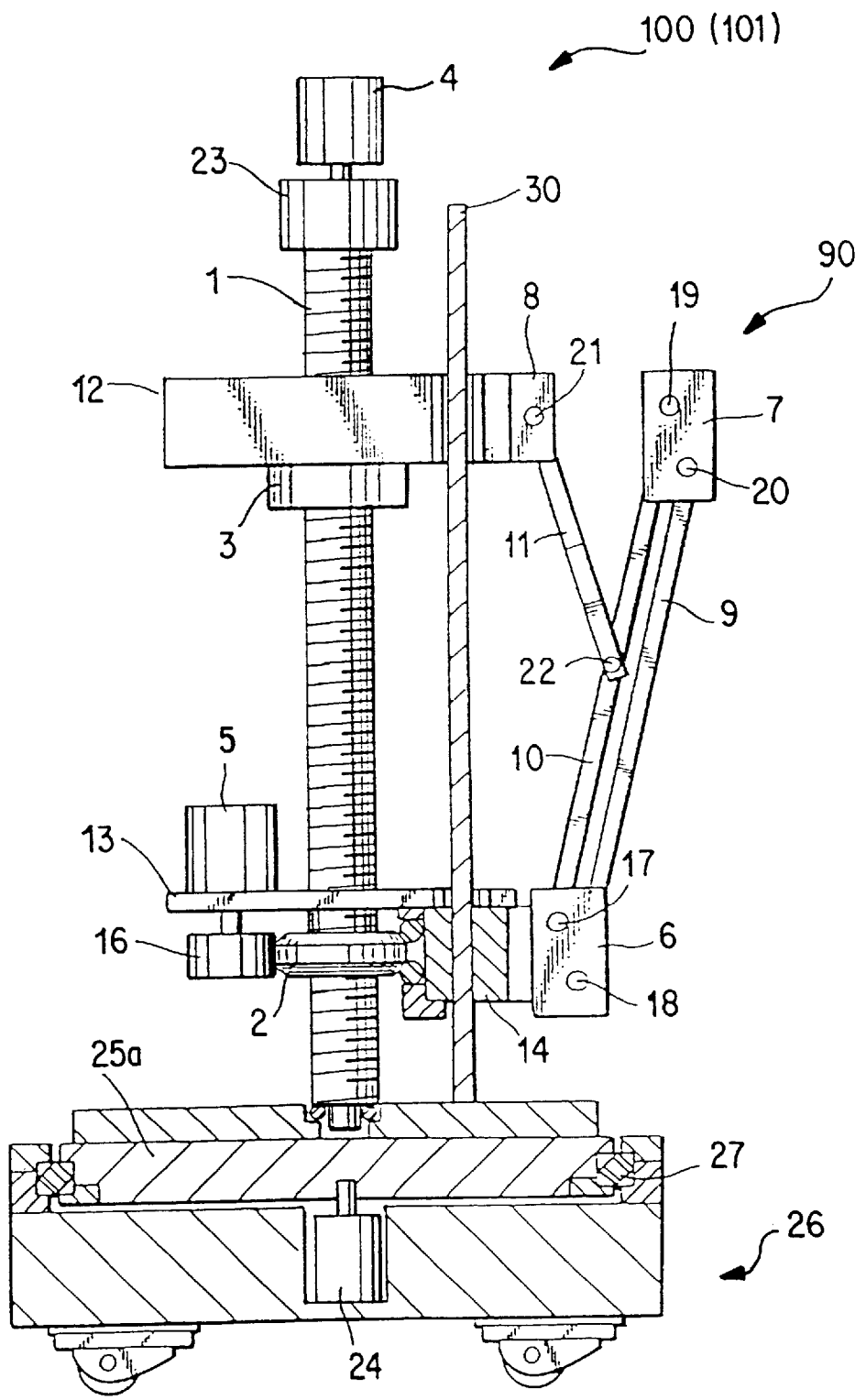
FIG. 7 is a partially sectional vertical view of a transfer unit to which the invention is applied.

As illustrated in FIG. 7, a truck 26 in which a motor 24 is fixed with its drive shaft directed upward is installed below the transfer unit 100 (101), and the transfer unit 100 (101) is carried by it through a bed 25a provided with a bearing 27.

When the motor 24 is driven to rotate the bed 25a, the transfer unit 100 (101) is similarly rotated and a direction of the arm 90 (91) can be changed. In this instance, it is desirable to align the drive shaft of the motor 24 with an axis of the shaft 1.

The transfer unit of this invention can be used for an application described below, for example. In FIG. 6, it is assumed that workpieces are moved in an order of A, B and C. The arm 91 is moved in a horizontal direction apart from the shaft 1 to hold an unworked workpiece placed on a not-shown work bench installed in the A-direction. At the same time, the arm 91 is moved in a horizontal direction apart from the shaft 1 to hold a worked workpiece placed on a not-shown other work bench installed in the B-direction. The arms 90, 91 are moved in horizontal directions toward the shaft 1 and the shaft 1 is then rotated clockwise by 90 degrees. The arms 90, 91 are moved in horizontal directions apart from the shaft 1, and heights of the workpieces are adjusted to those of the work benches. The unworked workpiece held by the arm 91 is mounted on the work bench installed in the B-direction, and the worked workpiece held by the arm 90 is moved in C-direction. The arms 90, 91 are moved in the horizontal directions toward the shaft 1 and the shaft 1 is then rotated counterclockwise by 90 degrees. Thus, the state of FIG. 6 is restored. In this instance, when the arms 90, 91 do not interfere with equipment and operators in the factory even when the arms hold the workpieces and rotate as they are, it is not necessary to move the arms 90, 91 toward the shaft 1 specially, and only the adjustments of vertical heights are required.

The production line will work smoothly by repeating these operations.

Members of the shaft 1 etc. for the transfer units 100, 101 are not necessarily made of steel, but they may be made of high strength materials, such as stainless steel, aluminum steel, reinforced plastics, ceramics, new-ceramics etc.

Fourth Embodiment

Figure 8:
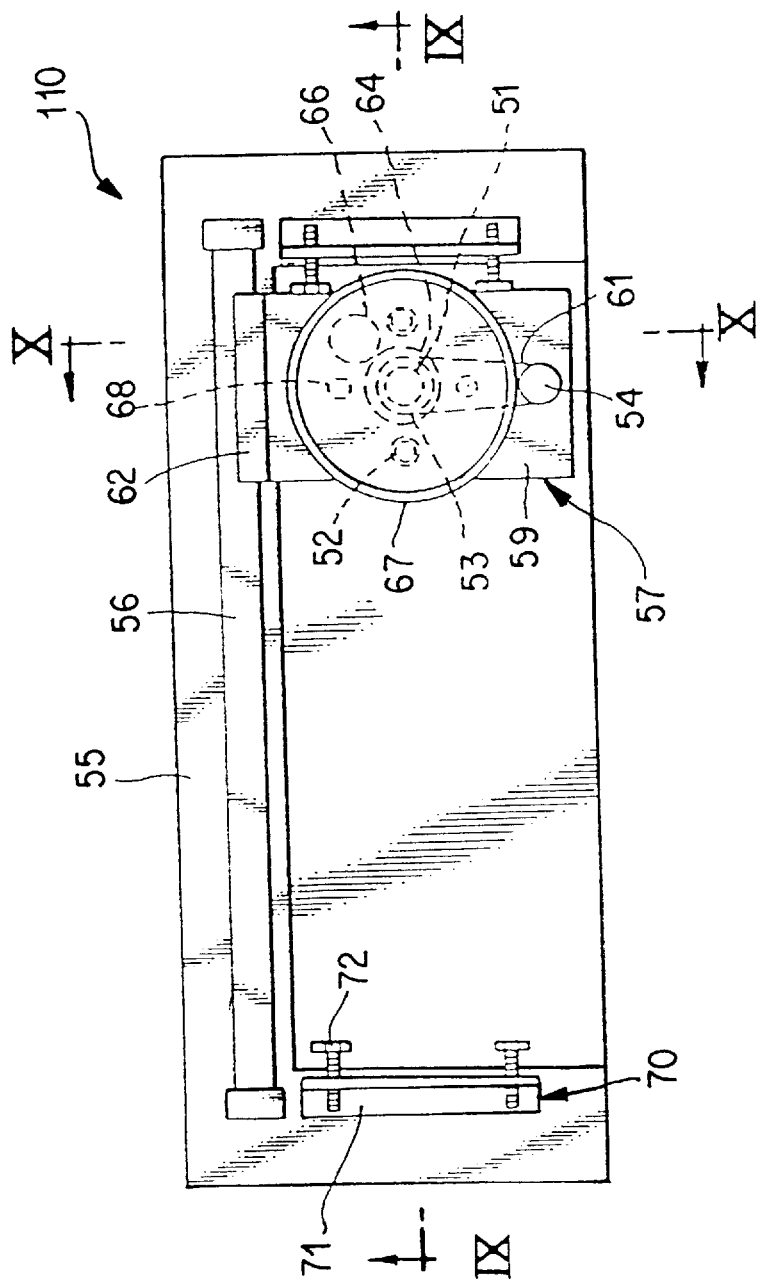
FIG. 8 is a plan view of a transfer unit to which the invention of claim 4 is applied.

FIG. 8 shows a plan view of a transfer unit 110 to which the invention is applied, and the transfer unit 110 is composed of a bed 55, a traversing unit 56, and a transfer portion 57 etc.

The bed 55 may be made of any material provided that it can support the transfer portion 57. A rod-less cylinder or a chain conveyor is used for the traversing unit 56 shown in FIG. 8.

Figure 9:
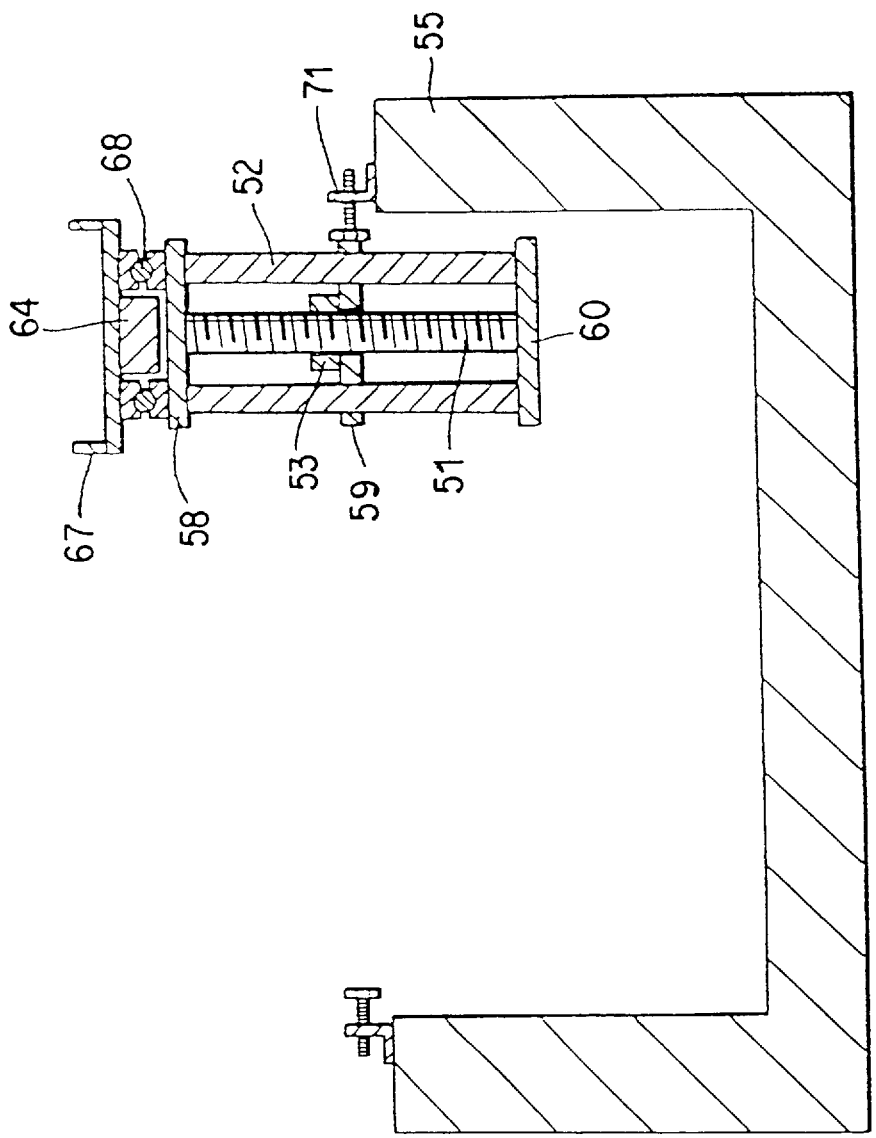
FIG. 9 is a sectional view taken on the line IX—IX of FIG. 8.

As illustrated in FIG. 9 which is the sectional view taken on the line IX—IX of FIG. 8, the transfer portion 57 is composed of a steel shaft 51, pillars 52, a nut 53, and plates 58, 59 and 60.

The shaft 51 is threaded over its entire length, the nut 53 is secured onto this thread, the plate 59 is fixed to the nut 53 through a not shown bearing, a motor with servo mechanism 54 is installed on the plate 59., and a drive force of the motor 54 is transmitted to the nut 53 through a belt 61. A bracket 62 engaging with the traversing unit 56 is fixed to the plate 59.

The two pillars 52 and the shaft 51 pass through the plate 59 in parallel with the shaft 51 to sandwich the shaft 51. The plates 58, 60 are fixed to both ends of the shaft 51 and the plates 52, respectively.

Figure 10:
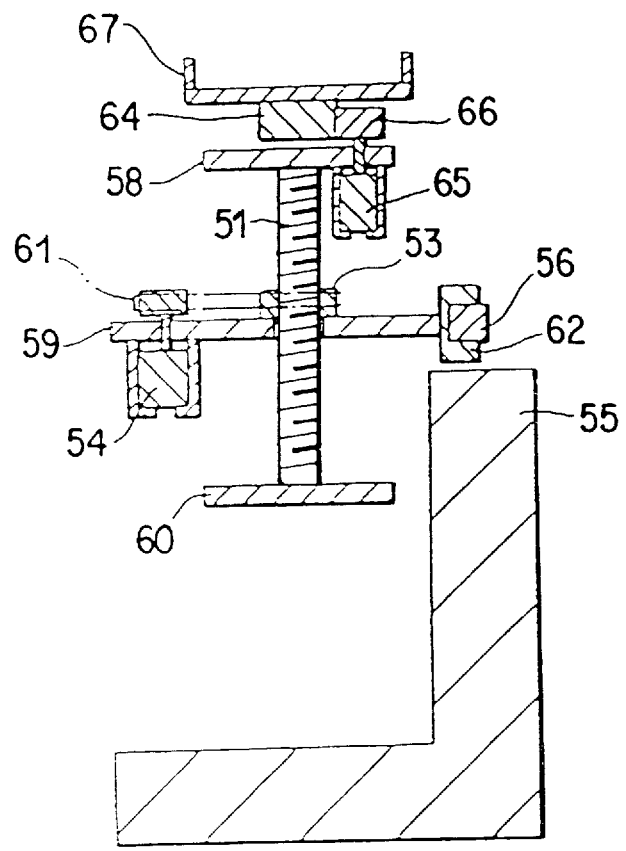
FIG. 10 is a sectional view taken on the line X—X of FIG. 8.

As illustrated in FIG. 9, a steel receiver 67 for loading a workpiece on it is installed on the plate 58 through a bearing 68, a large gear 64 whose axis is aligned with that of the shaft 51 and not in contact with the plate 58, is fixed to a bottom face of the receiver 67. As illustrated in FIG. 10, a small gear 66 engages with the large gear 64 and the small gear 66 can be rotated by a motor 65 fitted to the plate 58.

As illustrated in FIG. 8, the bed 55 is provided with an angle adjusting stopper 70 which finely adjusts the workpiece to its appropriate position in the vicinity of moving terminal of the transfer portion 57 when it moves along the traversing unit 56.

The angle adjusting stopper 70 is composed of a flange 71 fixed to the bed 55 and having tapped holes (not shown) and bolts 72 screwed in the tapped holes of the flange 71. The transfer portion 57 (workpiece) is finely adjusted its position by screwing in and out the bolts 72.

The function will be explained hereunder.

The transfer portion 57 is positioned at the right end of the traversing unit 56 as shown in FIG. 8.

When the workpiece is placed on the receiver 67 by the transfer unit 100, the placed workpiece is adjusted its position to an appropriate position by driving the motor 65 and the transfer portion 57 is moved to the left end by driving the traversing unit 56. When the transfer portion 57 is moved to the left end of the traversing unit 56, the transfer portion 57 strikes against the angle adjusting stopper 70, the transfer portion 57 is finely adjusted its position so that the workpiece is finely adjusted its position as a result. Further, the motor 54 is driven and the nut 53 is rotated to move the transfer portion 57 up and down, so that the workpiece is adjusted to a height required for the next working process.

Here, the motors 54, 65 and the traversing unit 56 can be driven simultaneously.

In FIGS. 8, 10, the transfer portion 57 is constructed into a cantilever structure for supporting only the traversing unit 56 side for convenience of viewing the figures. However, a double-support structure may be used, in which rails are installed on both sides of the traversing unit 56. This structure is rather desirable.

I claim:

1. A transfer unit comprising:

a drive mechanism installed on a horizontal bed;

a transfer portion mounted on the drive mechanism;

two-point stoppers installed adjacent both ends of the drive mechanism to finely adjust positioning of said transfer portion;

wherein said transfer portion includes a first plate;

a second plate located above and parallel to said first plate;

a plurality of pillars arranged between the said first and second plates;

a shaft secured to said first and second plate at both ends thereof and having a threaded portion;

a nut mounted on said threaded portion;

a workpiece receiver installed on an upper face of said second plate so as to be rotatable relative to said second plate only;

a large gear fixed to a bottom face of the workpiece receiver;

a small gear engaging with the large gear and rotated by a first motor mounted on said second plate;

a third plate fixed to said nut; and a second motor mounted on said third plate for rotating said nut.

* * * * *

UNITED STATES PATENT AND TRADEMARK OFFICE
CERTIFICATE OF CORRECTION

PATENT NO. : 5,881,603
DATED : March 16, 1999
INVENTOR(S) : Masatoshi Kitamura

It is certified that error appears in the above-identified patent and that said Letters Patent is hereby corrected as shown below:

On the title page, item [73], Assignee: should read --

-- Nawaseikiseisakusho Corporation --.

Signed and Sealed this

Twentieth Day of July, 1999

Attest:

Q. TODD DICKINSON

Attesting Officer

Acting Commissioner of Patents and Trademarks